United States Patent [19]

Booth et al.

[11] Patent Number: 5,469,973
[45] Date of Patent: Nov. 28, 1995

[54] SORTING OPTICALLY DIFFERENT SOLID MASSES

[75] Inventors: Hubert J. Booth; Paul H. Steagall, III; Michael W. Wright, all of Florence, S.C.

[73] Assignee: Wellman, Inc., Johnsonville, S.C.

[21] Appl. No.: 286,382

[22] Filed: Aug. 4, 1994

Related U.S. Application Data

[63] Continuation of Ser. No. 156,353, Nov. 22, 1993, abandoned, which is a continuation of Ser. No. 669,043, Mar. 14, 1991, abandoned.

[51] Int. Cl.$^6$ .................................................. B07C 5/342
[52] U.S. Cl. ........................ 209/580; 209/588; 209/939
[58] Field of Search ........................... 209/31, 522, 523, 209/524, 588, 644, 908, 556, 557, 580, 581, 928, 558, 639, 920, 914, 934, 539, 939, 917, 922, 923; 241/99; 100/35, 90, 91, 902; 81/3.2; 198/441, 436, 601, 442, 771

[56] References Cited

U.S. PATENT DOCUMENTS

| | | | |
|---|---|---|---|
| 3,197,647 | 7/1965 | Fraenkel | 209/588 X |
| 4,135,615 | 1/1979 | Brackmann et al. | 198/441 |
| 4,153,206 | 5/1979 | Haefner | 241/99 X |
| 4,172,397 | 10/1979 | Herbert | 81/3.2 |
| 4,351,437 | 9/1982 | Long | 209/939 X |
| 4,373,638 | 2/1983 | Schapper | 209/908 X |
| 4,702,379 | 10/1987 | Clayton et al. | 209/589 X |
| 4,726,898 | 2/1988 | Mills et al. | 209/939 X |
| 4,919,534 | 4/1990 | Reed | 209/524 X |
| 5,042,634 | 8/1991 | Gulmini | 100/902 X |
| 5,141,110 | 8/1992 | Trischan et al. | 209/588 |
| 5,184,733 | 2/1993 | Arnarson et al. | 209/939 X |
| 5,335,791 | 8/1994 | Eason | 209/939 X |
| 5,344,026 | 9/1994 | Booth et al. | 209/580 |

FOREIGN PATENT DOCUMENTS

| | | | |
|---|---|---|---|
| 291959 | 11/1988 | European Pat. Off. | 209/589 |
| 353457 | 2/1990 | European Pat. Off. | 209/576 |
| 2632879 | 12/1989 | France | 209/524 |
| 2198662 | 6/1988 | United Kingdom | 209/930 |

*Primary Examiner*—David H. Bollinger
*Attorney, Agent, or Firm*—Bell, Seltzer, Park & Gibson

[57] ABSTRACT

Masses of differently optically transmissive materials, such as plastic bottles of different composition or color, are separated using the different transmissivity to separate masses in a moving stream.

32 Claims, 11 Drawing Sheets

SORTING OPTICALLY DIFFERENT SOLID MASSES

This is a continuation of application Ser. No. 08/156,353 filed on 22 Nov. 1993, now abandoned, which is a continuation of abandoned application Ser. No. 07/669,043 filed on 14 Mar. 1991 abandoned.

FIELD OF THE INVENTION

This invention relates to separating a mixture of solid masses certain of which are optically different from others into groupings of optically similar masses. In particular, it relates to so sorting recycled bottles constituted of different plastic materials or colors.

BACKGROUND OF THE INVENTION

It is known to reflectively sense color in a mixture of materials and pneumatically separate one sensed color from another, as in Perkins U.S. Pat. No. 3,782,544, "Automatic Grader", granted Jan. 1, 1974 and Hansen, Jr. U.S. Pat. No. 4,056,463, "Tobacco/Paper Sorter Method and Apparatus", granted Nov. 1, 1977.

SUMMARY OF THE INVENTION

It has been discovered that different optical transmissivity characteristics of mixed masses of material may be sensed to actuate means for separating such masses. In another aspect of the broad invention, it has been discovered that a stream of such a mixture may be provided, as well as first sensing means to determine whether a mass is a presence, light means to cause beam impingement on the mass presence, and means responsive to the transmissivity characteristics of the mass to selectively remove certain of the mixture from the stream.

In preferred embodiments, the stream is one falling through air, the removal means is pneumatic, there is successive separation by material and color, and novel means are provided to convey mixed streams of masses to separating discriminators.

PREFERRED EMBODIMENT

There follows a disclosure of the preferred embodiment, with drawings and descriptions of structure and operation.

STRUCTURE

Figure 1:
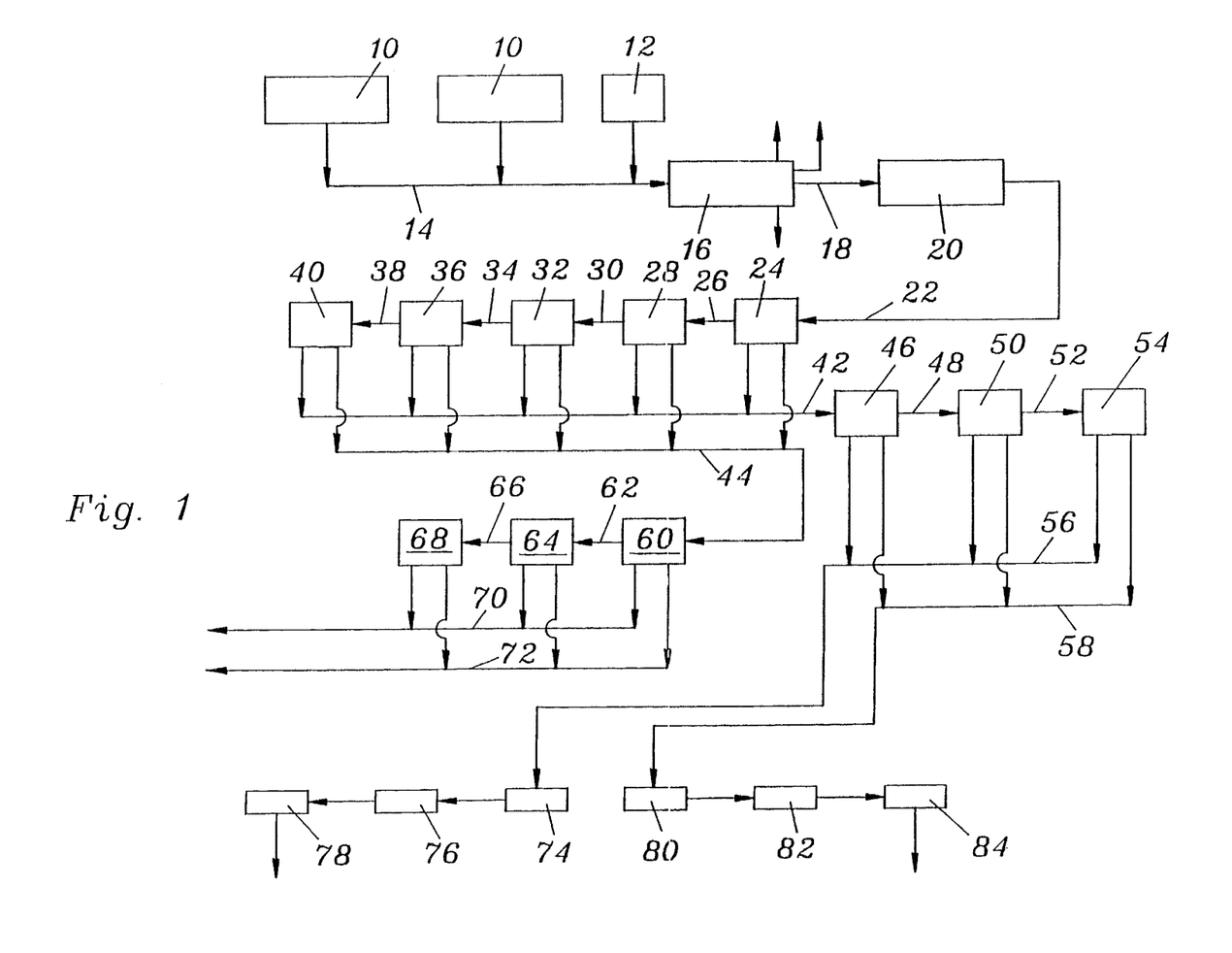
FIG. 1 is a flow chart with respect to said preferred embodiment.

Turning now to FIG. 1, there is shown two tumbler debalers 10 arranged, as is the output from "cluster buster" 12, for discharge onto conveyor 14 for delivery thereby to vibrating screener 16. A magnet (hot shown), suitably of the type supplied by the Dings Co. as Model 55, extends over and across conveyor belt 14 just upstream of cluster buster 12, to remove impurities with magnetic characteristics. Conveyor 18 is located to move pieces in the desired size range into surge hopper 20, which is mounted to discharge onto conveyor 22 for delivery to separator 24 of a first fraction of the conveyor 22 stream, movement on conveyor 26 to separator 28 of a second such fraction, movement on conveyor 30 to separator 32 of a third such fraction, movement on conveyor 34 to separator 36 of a fourth such fraction, and movement on conveyor 38 to separator 40 of the fifth such fraction.

Each of separators 24, 28, 32, 36, 40 discharges a high density polyethylene (HDPE) output onto conveyor belt 42 and a polyethylene terephthalate (PET) output onto conveyor belt 44.

Conveyor belt 42 delivers a first fraction of HDPE to separator 46, conveyor belt 48 delivers a second such fraction to separator 50, and conveyor belt 52 delivers a third such fraction to separator 54.

Each of separators 46, 50, 54 discharges clear HDPE output onto conveyor belt 56 and colored HDPE output onto conveyor belt 58.

Conveyor belt 56 delivers clear HDPE to decapper 74, the output of which flows into shredder 76, the output of which flows into granulator 78, from which flake clear HDPE is discharged. Conveyor belt 58 delivers colored HDPE to decapper 80, the output of which flows into shredder 82, the output of which flows into granulator 84, from which flake colored HDPE is discharged.

Conveyor belt 44 delivers a first fraction of PET to separator 60, conveyor belt 62 delivers a second such fraction to separator 64, and conveyor belt 66 delivers a third such fraction to separator 68.

Each of separators 60, 64, 68 discharges clear PET output onto conveyor belt 70 and green PET output onto conveyor belt 72.

Figure 2:
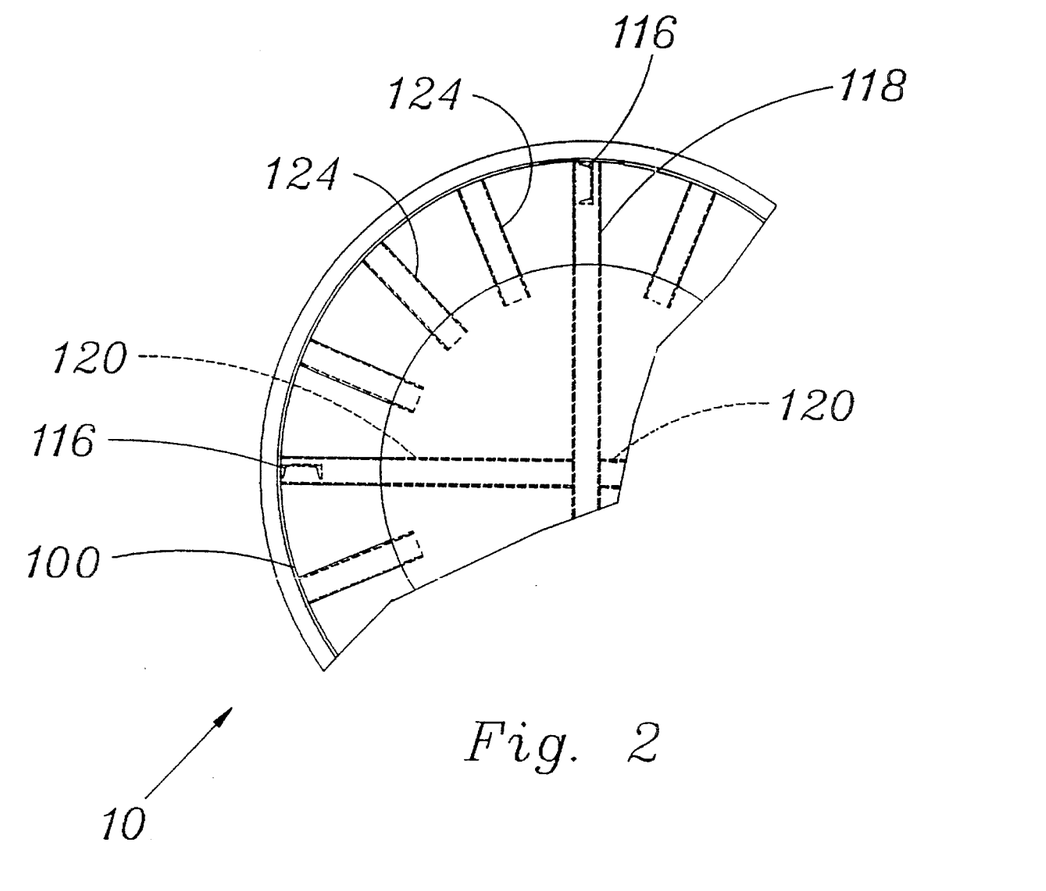
FIG. 2 is a broken-away downstream end elevation of the debaler of the preferred embodiment.
Figure 3:
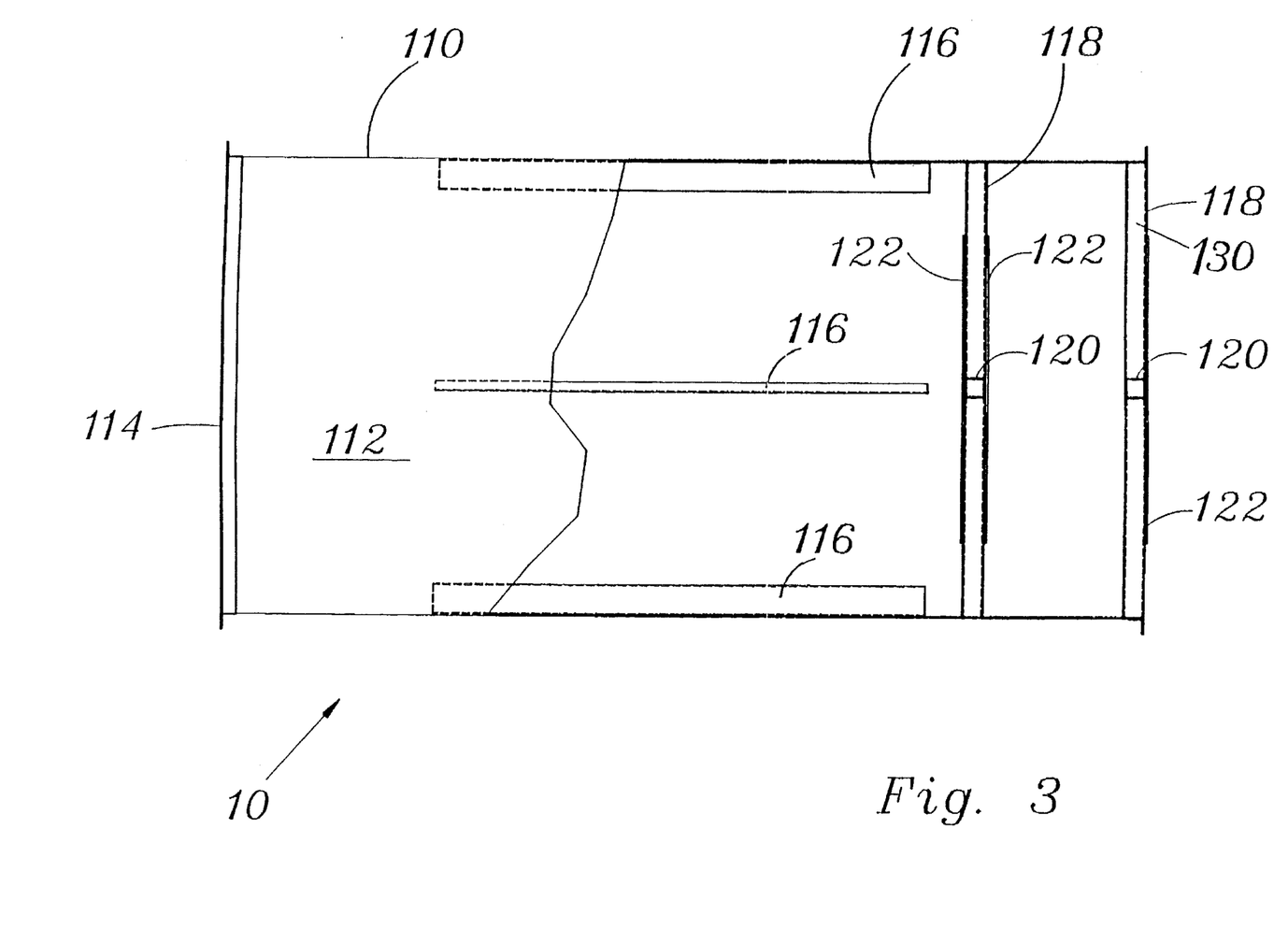
FIG. 3 is a side elevation, partially broken-away and partially diagrammatic, of the debaler of FIG. 2.
Figure 4:
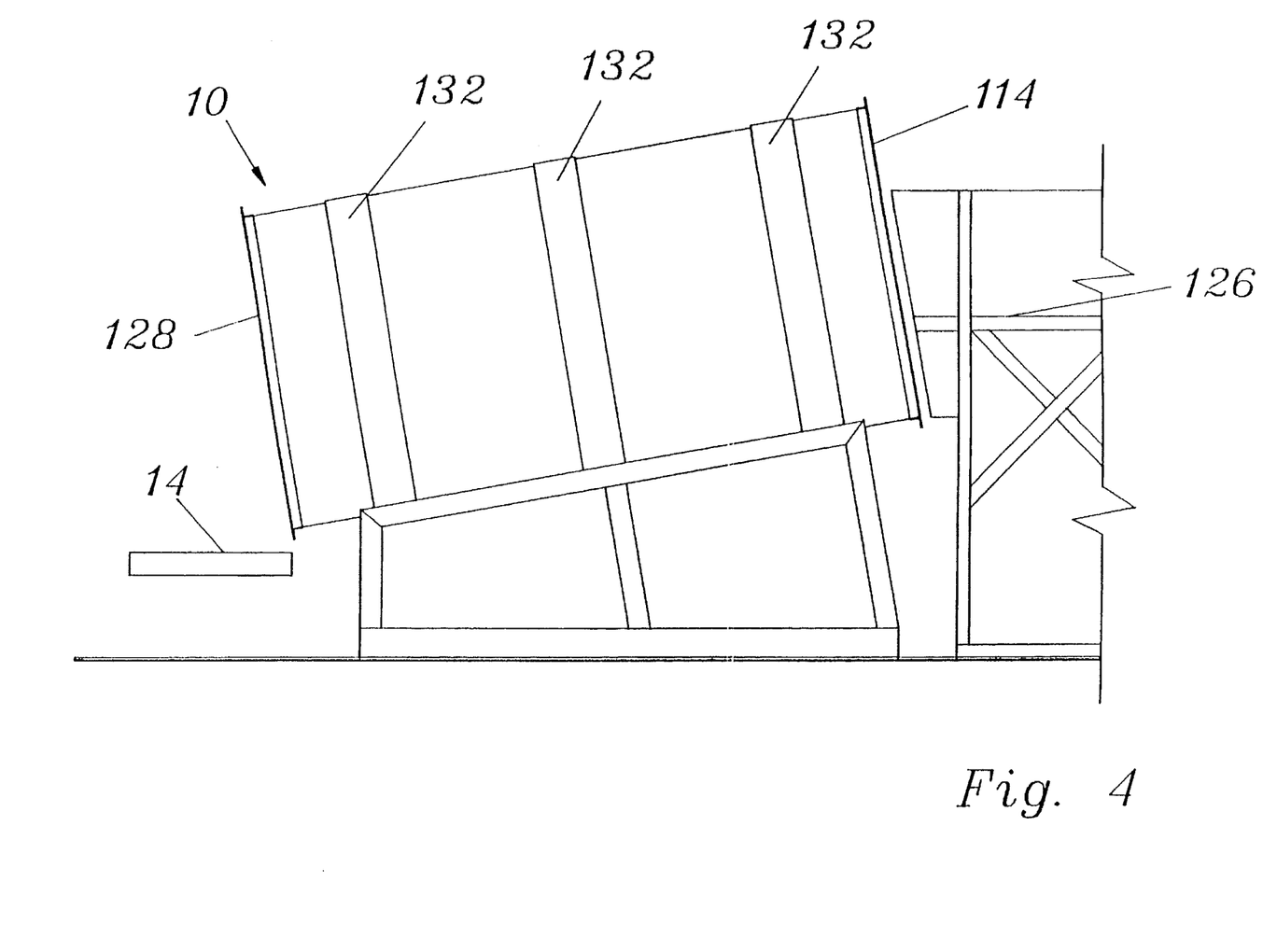
FIG. 4 is a side elevation view of the debaler as mounted, and, partially broken-away, of the cooperating access platform.

Tumbler debaler 10 is shown in FIGS. 2, 3 and 4.

Thin wall 100 defines a drum-like housing 110 internally uninterrupted throughout an inlet zone 112, including fully open end 114. Extending longitudinally along the inner surface of wall 100 are four equally circumferentially spaced elevator agitator channel iron members 116. Extending diametrically across the interior downstream of lifters 116 is square tube iron member 118 to which are welded at 90° circumferential spacing two square tube members 120. Secured on members 118 and 120 are imperforate shell plates 122. At the outlet end of tumbler 10 are repeated the same members 118, 120 assembly, along with one plate 122, on the downstream side of the downstream members 118, 120 set. Extending from wall 100 radially, at circumferential angles of 22½° from one another and from members 118, 120, formed of the same square tubing as members 118, 120, with axes coplanar with the axes of members 118, 120, are twelve projections 124, three in each quadrant.

Tumbler 10 is shown mounted in FIG. 4. A work stand floor 126 is adjacent open end 114 and stairs (not shown). Beneath outlet 128 is conveyor 14. Steel wear rings 132 cooperate with rotatable elastomeric-surfaced frictional means (not shown) for rotating tumbler 10.

Figure 5:
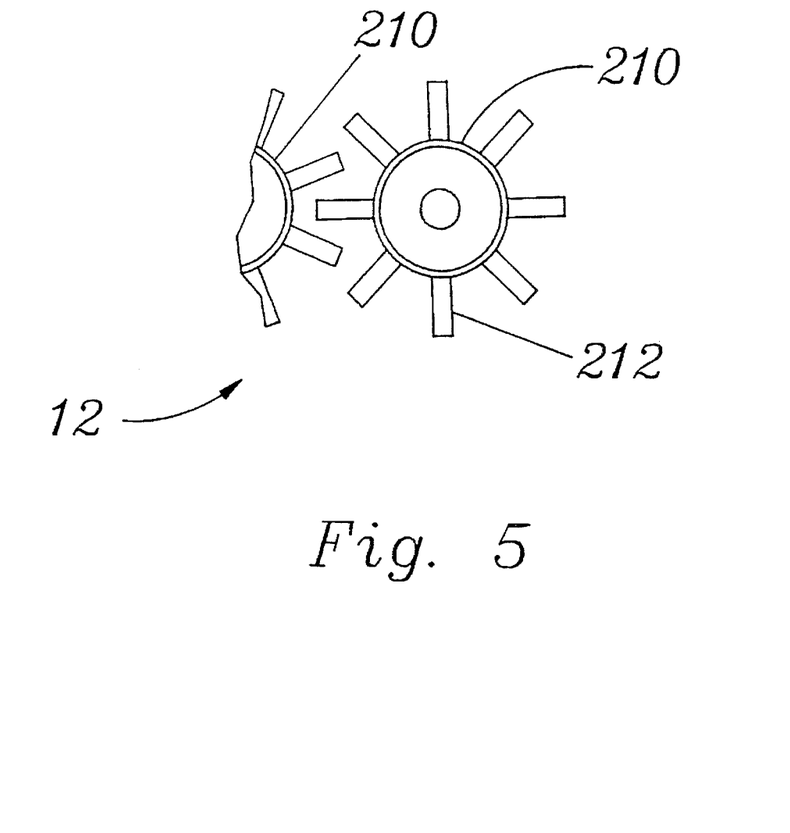
FIG. 5 is an end elevation view, broken-away, of the rotating members of the bottle declumper of the preferred embodiment.
Figure 6:
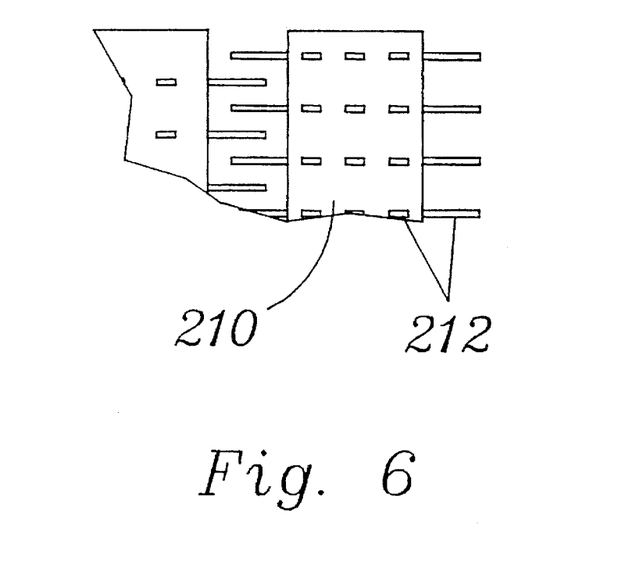
FIG. 6 is a plan view, also broken-away, of the embodiment of FIG. 5.

There is shown in FIGS. 5 and 6 the rotating parts of declumper 12.

Two round bodies 210 each of diameter twelve inches carry each eight circumferential rows, each row equally circumferentially spaced from the next, of pins 212. These pins define also transverse rows, with nine pins in each. The rolls are mounted in a housing for rotation (not shown) on a center-line spacing of nineteen inches. The pins 212 are four inches long, one and one-half inches wide (in a circumferential direction), and three-quarters of an inch thick in their third dimension (being thus rectangular in planes perpendicular to a pin's longest dimension).

Figure 7:
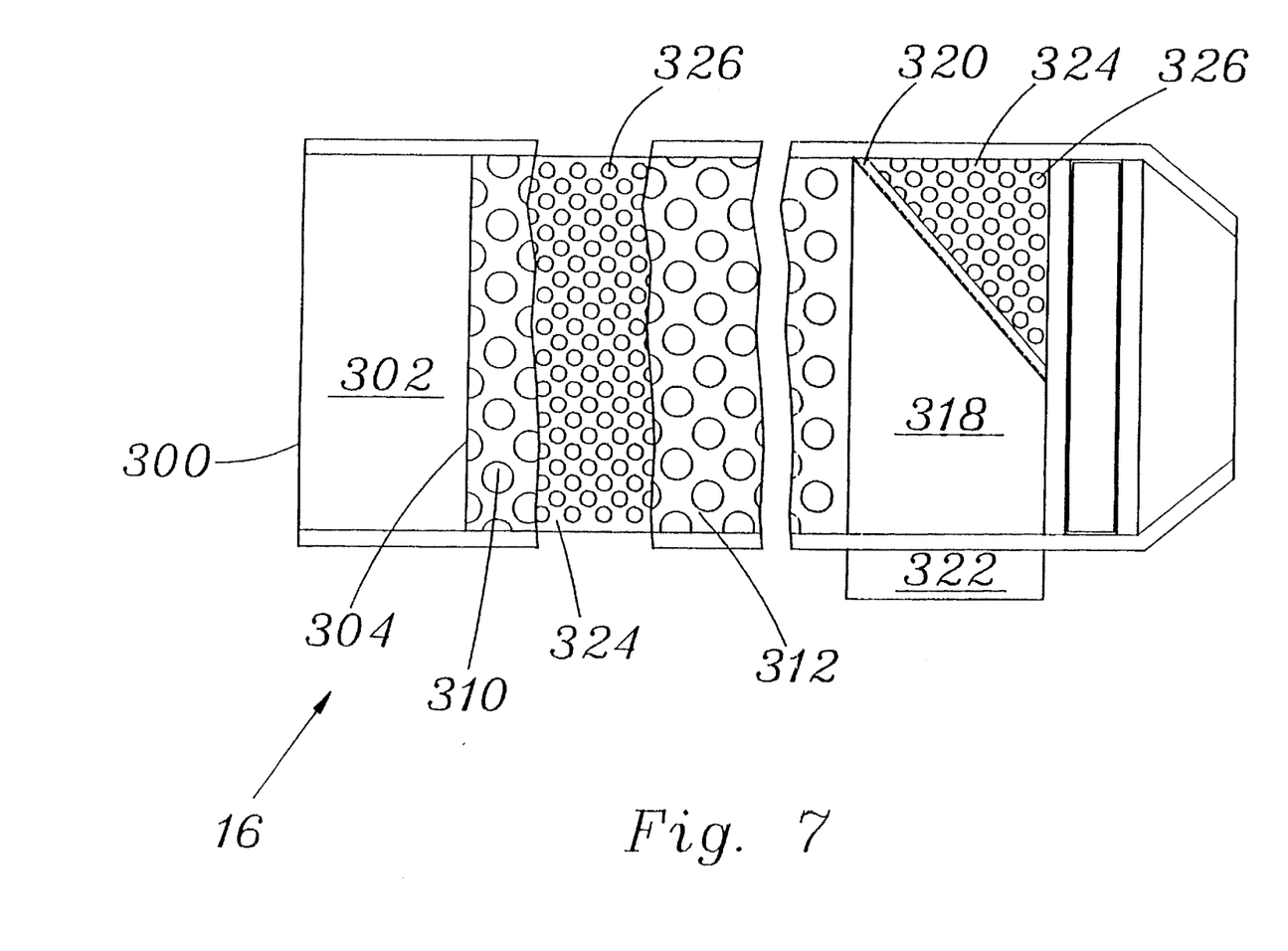
FIG. 7 is a plan view, broken-away centrally, and with a top portion broken away to the left thereof, of a screening unit of said embodiment.
Figure 8:
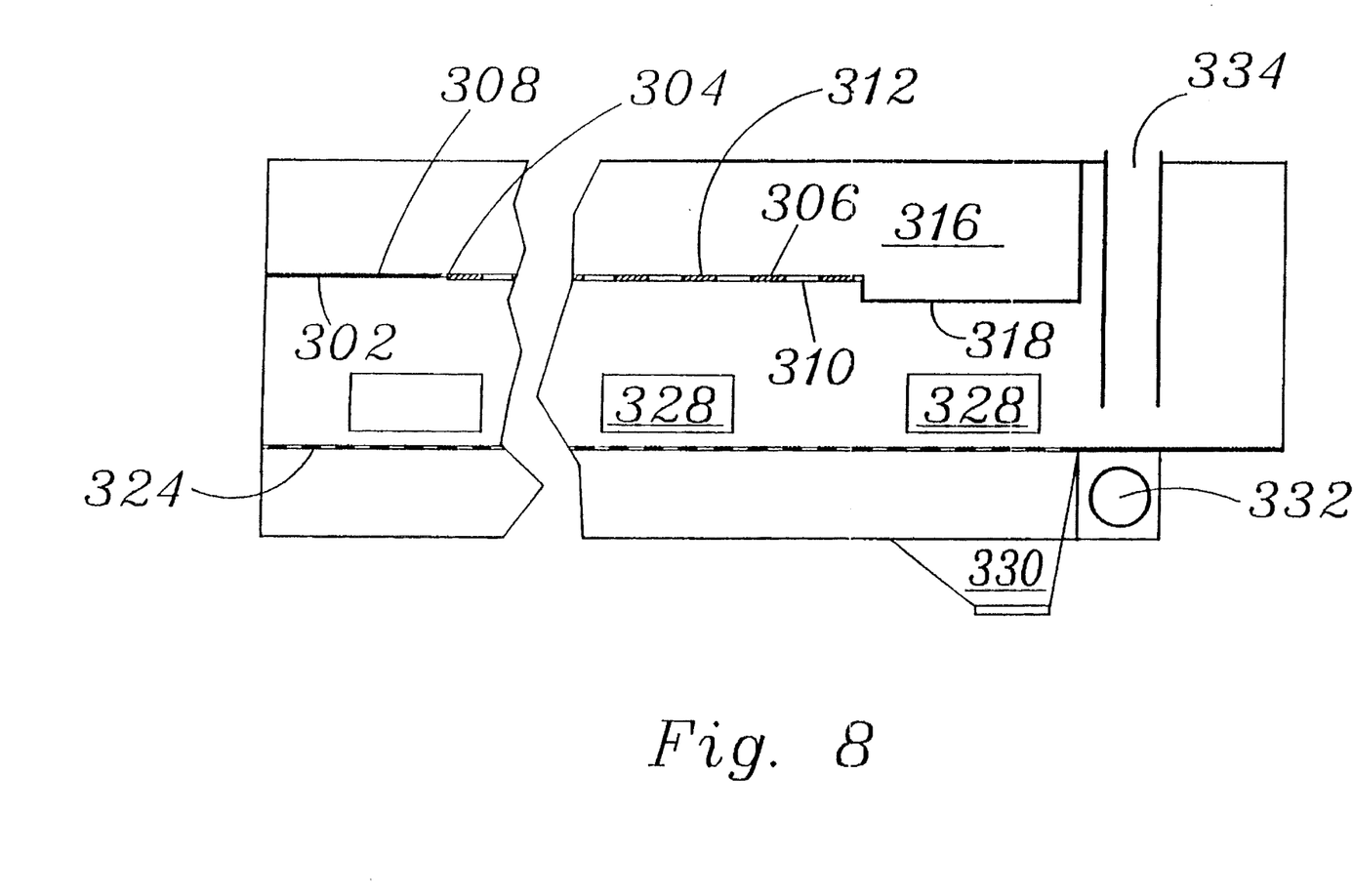
FIG. 8 is a longitudinal vertical sectional view, partially broken-away, of said screening unit.

Vibrating screener 16 is shown in FIGS. 7 and 8.

At the input end 300 of the screener is horizontal continuous flat plate 302, which ends at edge 304. Extending from edge 304 with its top surface 306 in the plane of the top surface 308 of plate 302 is perforated plate 312, with nine-inch holes 310, which ends at opening 316 over plate 318, one side of which is defined by angle iron plough 320, for diverting undesirably large pieces and clumps of bottles out exit 322.

The screener 16 is mounted on a vibrating support (not shown) of type well known, motor driven to give screener 16 an oscillating movement in planes angled 45° to horizontal and to sheets 308, 312, and 318, and perforated sheet 324, which has 3" diameter holes 326. Access doors 328 are provided for cleaning sheet 324.

Exit element 330 for fines, air inlet 332, and hood 334 (adjustable vertically through selectively tightenable bolts carried by the hood and cooperative with slits in the screener 16 housing, not shown) complete the basic arrangement.

Separators of the preferred embodiment are shown in FIGS. 9 through 12.

Figure 9:
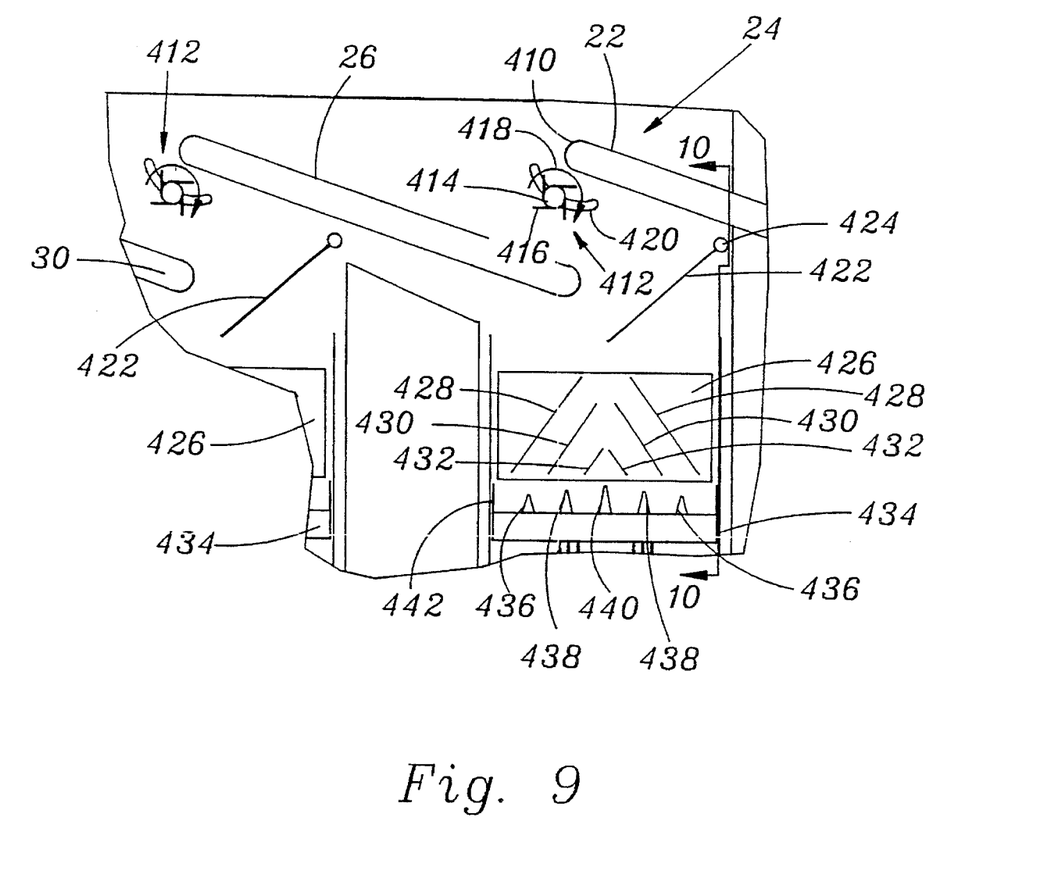
FIG. 9 is a partial side elevation view of portions of separators according to the preferred embodiment.
Figure 10:
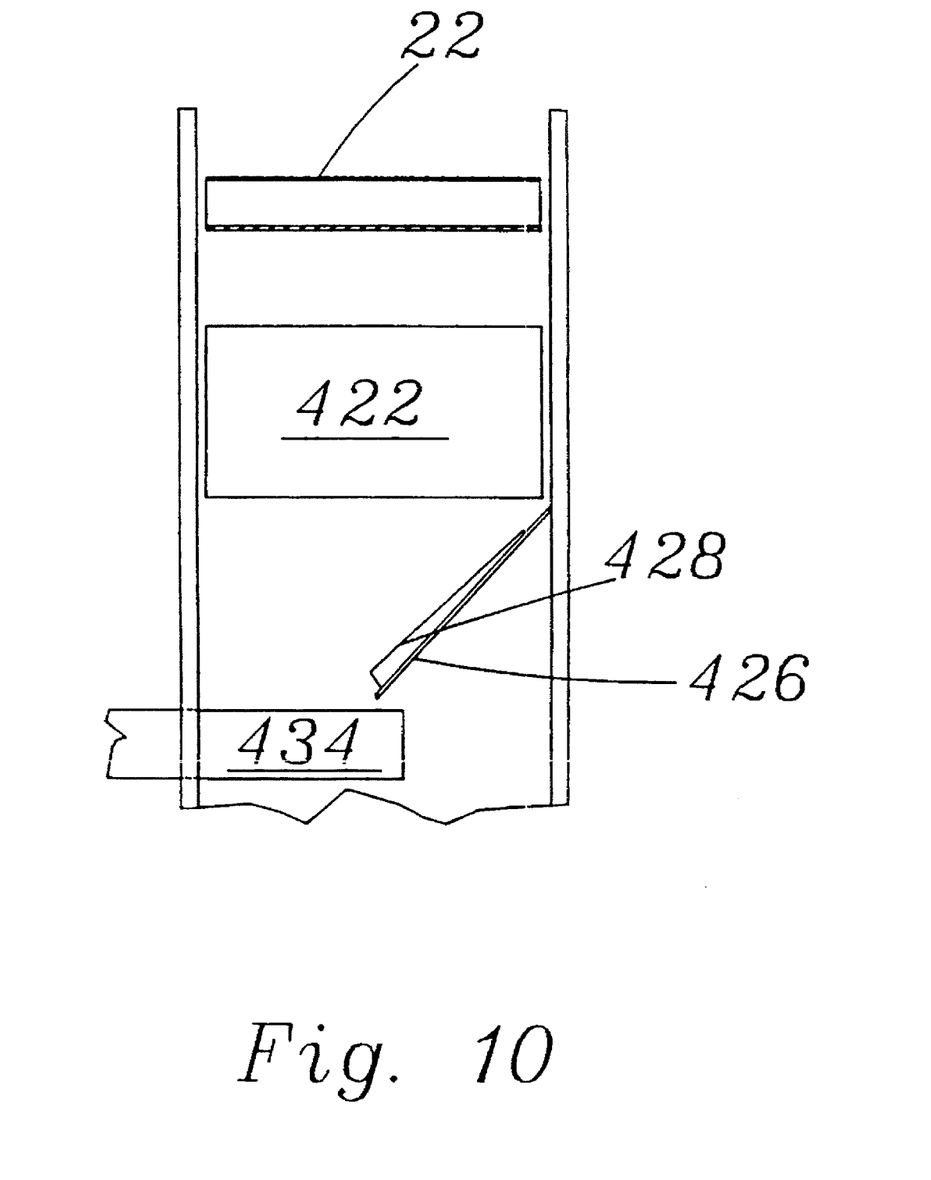
FIG. 10 is a sectional view taken at 10—10 of FIG. 9.

There is shown in FIG. 9 belt conveyor 22, upwardly inclined in the bottle stream flow direction, and with its downstream end 410 above doffer 412, which is mounted for rotation at a selectable angular velocity. Doffer 412 includes mounting portion 414 and, carried thereby and extending therefrom at four tangents to cylindrical mounting portion 414 four blades 416 (which, as does mounting portion 414, extend beneath belt 410 for the full width of the latter). Arrow 418 shows the direction of rotation of doffer 412. Arcuate slot 420 cooperates with a portion of doffer 412 slidably fitting therein to permit selectively repositioning doffer 412 relative to the end 410 of conveyor belt 22.

Guide 422 rotatably adjustable about the axis of pivot member 424 (and, like the doffer, re-securable at each new position selected) extends for the full width of conveyor belt 22.

Extending beneath doffer 412 and guide 422 is divider 426, which includes six divider walls 428, 430, 432, which are illustrated diagrammatically in FIG. 9. Walls 430 and 432 taper in a bottle flow direction, like wall 428, from a lower width at upstream ends to greater width at downstream ends.

Beneath divider 426 is vibrating conveyor 434, which is of construction well known in industry, except for its longitudinal dividers 436, 438, 440. Each of these dividers is triangular in transverse cross-section, with center divider 440 higher than the adjacent dividers 438, which are in turn higher than outer dividers 436. Six channels are thus defined by the dividers and the conveyor walls 442.

Also shown in FIG. 9 are conveyor 26, the upstream end of which is beneath the downstream end of conveyor 22; and conveyor belt 30, the upstream end of which is beneath the downstream end of conveyor 26.

Also shown is doffer 412 of separator 28, as well as its guide 422, divider 426, and vibrating conveyor 434.

Each of the eleven separators shown diagrammatically in FIG. 1 is constructed in the same way, and successive separators of a set (three sets are shown in FIG. 1, one set of five—24, 28, 32, 36, 40—and two sets of three—46, 50, 54 and 60, 64, 68) are interrelated in the same way.

Figure 11:
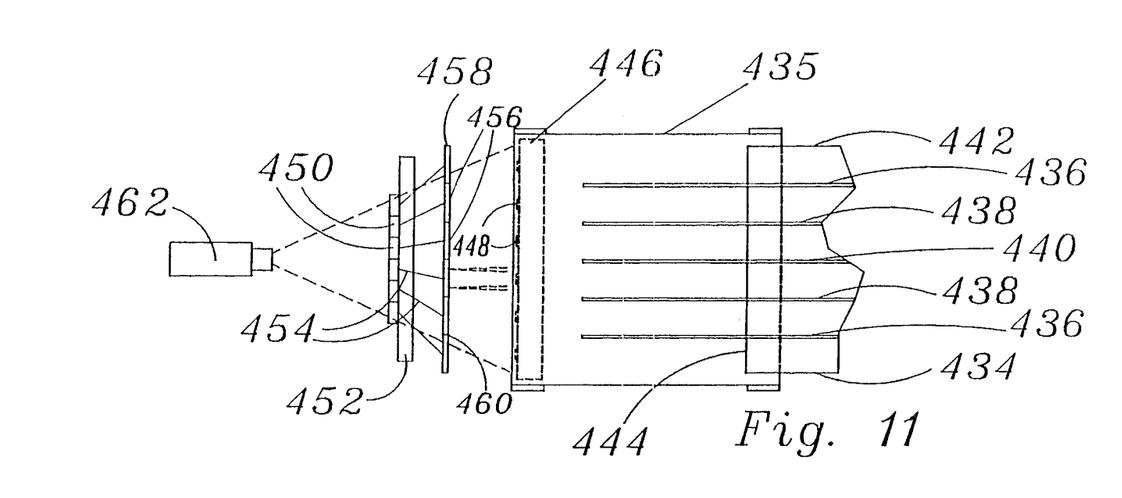
FIG. 11 is a broken-away, somewhat diagrammatic plan view of the discriminator portion of the separators partially shown in FIGS. 9 and 10.
Figure 12:
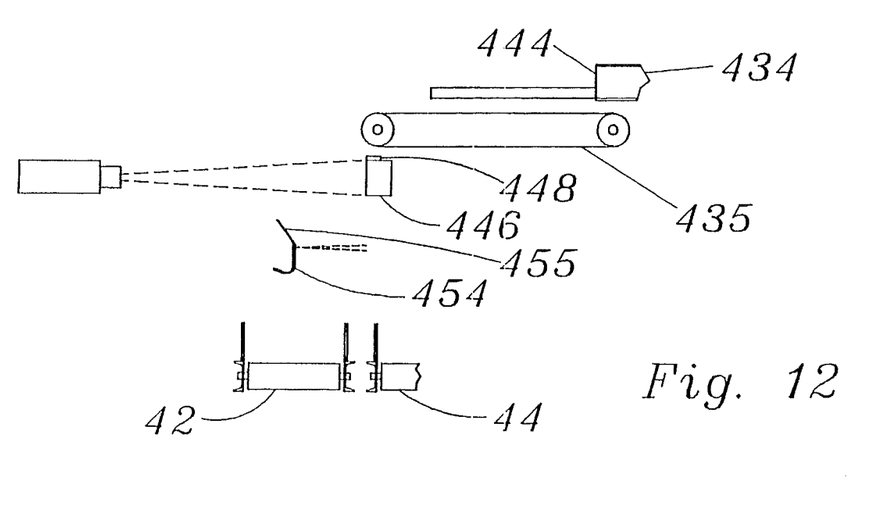
FIG. 12 is a broken-away side elevation view of the portion of FIG. 11.
Figure 13:
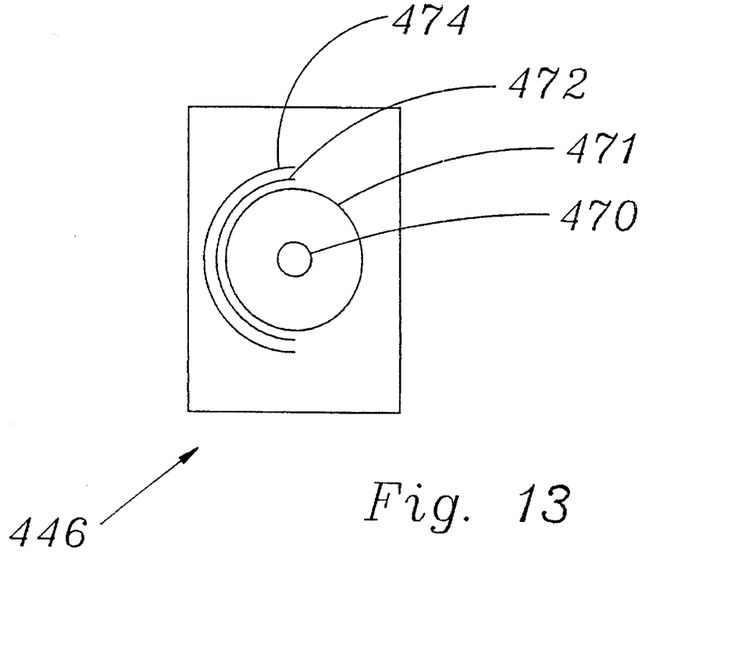
FIG. 13 is a vertical sectional view through the light box of FIG. 12.

There is shown in FIGS. 11, 12, and 13 the discriminator portion of separator 24.

Vibrating conveyor 434 has an end 444 reciprocable just above conveyor belt 435, which extends to just downstream of neon light source 446 and proximity sensors 448 mounted on light source 446. (Vibrating conveyor 434 is mounted to vibrate in both longitudinal and vertical directions, about circles ½ inch in diameter, in longitudinal vertical planes, at 750 rpm, and conveys at about 60 feet per minute. A suitable such vibrating conveyor is available under the trademark PANDA from GBE/Legg, of Richmond, Va.) Conveyor belt 435 conveys at 160 feet per minute, to space further apart the bottles.

Six solenoid switches 450 are selectively openable to open compressed air reservoir 452 to specific ones of six air conduits 454 (diagrammatic showing in FIG. 11), which respectively pressurize selected zones 456 of air ejector manifold unit ("blaster bar") 458; zones 456 are separated by five walls 460 secured in manifold unit 458 slots (not shown). Each zone 456 is 6½ inches wide and contains 18 holes (not shown) each ¹⁄₁₆ inch in diameter, all the holes of all the zones having centers in a single line.

Light box 446 (FIG. 13) includes neon tube 470, cylindrical glass fixture 471, and affixed thereto 0.005 inches thick theater type red (transmitting at 650 and above nanometers) cellophane film 472, and affixed thereover polarizing film 474. Camera 462 has over its face a sheet of polarizing film perpendicularly oriented to film 474. Camera 462 also has over its lens a green filter, cut from a green plastic bottle, to facilitate green bottle sensing, in separators 24, 28, 32, 36, and 40 only. This figure illustrates the light box for discriminators for separators 60, 64, and 68. In the other separators, which do not involve a clear from green separation, the red filter is omitted. Tube 470 is a high-intensity tube, 54 watts, sold by A.E.G., West Germany, under the trademark POLYLUX. There is used with it a high-frequency (to eliminate the camera's seeing flicker) 32 KHz ballast.

Figure 14:
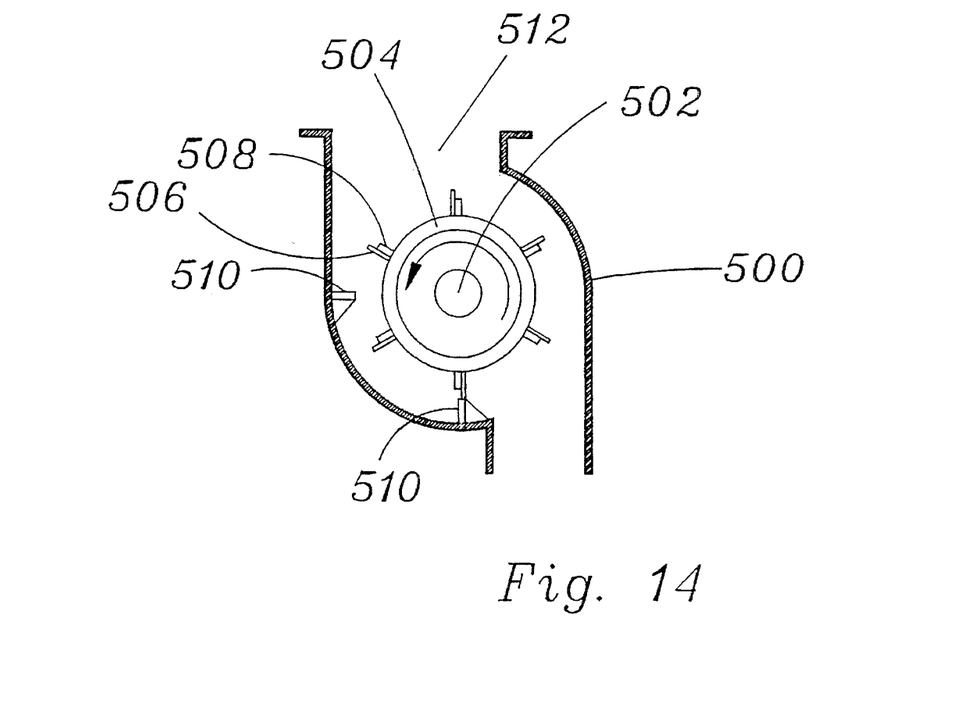
FIG. 14 is a vertical sectional view, partially diagrammatic, of the decapper of said embodiment.

There is shown in FIG. 14 the decapper 74, 80 of the invention.

Rotatably mounted in housing 500, for being driven by shaft 502, is cylindrical support 504, which carries six radially protruding blades 506 and welded-on support mounts 508 (the former being formed of AR-400 hardened steel and being in length-radially extending from support 504—3¼ inches, and in thickness—direction circumferentially of support 504—¼ inch; and the latter being formed of steel and being of length and thickness respectively 2½ inches and ½ inch). Blades 506 are replaceably mounted on mounts 508 with bolts (not shown).

Housing 500 carries two fixed blades 510 which extend parallel to bars 506 and which have a clearance therefrom in rotation of the rotatable assembly of 5/16 inch. The blades 510 are formed of AR-400 hardened steel, are ¼ inch in thickness, and are spaced 90° apart in the quadrant of housing 500 nearest the inlet 512 thereof.

OPERATION

In operation, bales of mixtures of crushed plastic bottles—of clear and colored HDPE, and clear and green PET (as originating from, for example, a city trash collection system)—are opened by an operator standing on platform 126

(FIG. 4) and introduced into the open end 114 of tumbler 10, which for the most part breaks the bale into discrete bottles, and dumps the entire bale contents through the annulus 130 around outer plate 122 onto conveyor belt 14. Longitudinally extending lifters 116 (FIG. 3) and bars 118, 120, 124 cooperate with disks 122 to break up most bottles into individual units.

Also discharging onto belt 14 is the output from declumper 12, which is fed by hand with interlocked groups of bottles removed byhand. The declumping action is of the pins 212 (FIGS. 5 and 6), the tips of which define intersecting circles as supports 210 turn, the pins of the two supports being however spaced and related for turning so that when the tip of one pin of one support is nearest the other support, it is angularly centrally related to two pins of that other support.

Belt 14 delivers the outputs of debalers 10 and declumper 12 to screener 16, which is shown in detail in FIGS. 7 and 8, onto plate 302. Undesirably large pieces fail to go through the holes 310, onto which the contents of plate 302 are moved by vibrations caused by the support, as is further movement in the same direction. These larger pieces then move onto plate 318, where plough 320 directs them out opening 322.

Pieces that fall through holes 310 fall onto screen 324, which is of course vibrating with the overall screener unit. Undesirable smaller items drop through holes 326 and are discarded through outlet 330. The desired-size pieces for the sorting are then moved under hood 334 along the surface as of sheet 324 and deposited on conveyor belt 18 for movement thereby into surge hopper 20, which is large enough to permit flow rate variation from upstream without slowing down flow rate downstream. Pieces of paper and film are blown by air introduced at inlet 332 and pulled by a fan at its top out through hood 334.

From surge hopper 20, the mixture of separated bottles drops onto conveyor belt 22, which moves them upwardly and over doffer 412 (FIG. 9), which rotates in the direction indicated by the arrow. As bottles drop from belt end 410, every fifth bottle is engaged by a blade 416 of doffer 412, which is made to rotate at a rate suitable to accomplish this and thus deliver one-fifth of the total .stream delivered at end 410. The bottles are thus successively thrown by blades 416 against guide 422, from which they then slide into divider 426, which includes walls 428, 430, 432 which divide the stream into six approximately equal transverse bottle streams. Divider 426 overlies vibrating conveyor 434, which is divided into six longitudinal channels by five dividers triangular in cross-section and centered on the bottom openings defined by the walls of divider 426. These five dividers 436, 438, 440 extend beyond the conveying surface of vibrating conveyor 434, as shown in FIGS. 11 and 12, and overlie belt conveyor 435.

The other four-fifths of the stream from conveyor 22 (the bottles, i.e., not impacted by a blade of the first doffer just described) fall on conveyor 26, which delivers them to another doffer 412, as shown in FIG. 9. This doffer functions to deliver to separator 28 (which is just like separator 24) another fifth of the original stream from belt 22. As before, the remainder goes on to separators 32, 36, and 40, another fifth of the original stream from belt 22 being then divided and spread just as was the case with separator 24, each separator having of course its own channeled vibrating conveyor. Each channel cross-sectional size of each conveyor is such that only one bottle can be accepted at any transverse cross-section, the bottles being thus longitudinally positioned relative to one another.

As shown in FIGS. 11 and 12, bottles fall from the ends 444 of the vibrating conveyors onto belt conveyor 435, and therefrom along a path between sensors 448 and light source 446, on the one hand, and line TV cameras 462 on the other. The vibrating conveyors advance the bottles thereon at 60 feet per minute, belt conveyor 435 at 160 feet per minute. For separators 24, 28, 32, 36, and 40, no red filter is included. Sensor 448 senses whether at a given instant a bottle is falling. If one is sensed, camera 462 turns on and senses the optical characteristics of the bottle. What is sensed in the separators just mentioned is simply the amount of white light transmitted, and on this basis separation of HDPE and PET is accomplished. Bottle crystallinity disrupts polarization caused by the light source polarizing element, so that light is transmitted into camera 462, permitting the required discrimination for separation. This separation has the additional advantage that most of any polyvinyl chloride material present, a very undesirable PET impurity, goes out with the HDPE, from which it may be easily separated by known non-optical methods.

Separators 46, 50, and 54 also separate by transmissivity of white light, without using a colored filter.

Separators 60, 64, and 68 separate clear and green using the red filter above described to minimize light transmission by green bottles.

OTHER EMBODIMENTS

Other embodiments within the invention will occur to those skilled in the art.

Thus, the masses may be other than crushed plastic bottles for recycling. The stream may be other than falling. Means to remove selected masses from the stream may be other than pneumatic.

The debaler may be otherwise constructed, as for example it may be the commercially available HUSTLER bale breaker No. BB-300, sold by Hustler Conveyor Co., 84 inches wide and nine feet long, which is indeed perhaps the presently preferred debaler.

Instead of one blaster bar, two may be used in parallel in order to increase the pneumatic reliability of bottle withdrawal from the falling stream as desired. Each blaster bar may be constructed as above described, air to them being supplied by a pair of reservoirs, each reservoir supplying a corresponding three portions of each blaster bar. Thus, two jets of air instead of one impinge on the falling body meant to be moved. Indeed, this is the presently most preferred embodiment.

What is claimed is:

1. Apparatus for separating plastic masses with differing optical transmissive properties comprising:

conveyor means for presenting continuously moving masses;

means for transmitting light through said moving masses; and means responsive to light transmitted through said moving masses to remove predetermined ones thereof, said light responsive means comprising a line scan camera;

said conveyor means being positioned for continuously presenting said moving masses to said light transmitting means and said light responsive means for transmittal of light therethrough.

2. The apparatus of claim 1 which includes also means for detecting whether any mass is present.

3. The apparatus of claim 1 in which said means for transmitting light includes a polarizing element for polarizing light therefrom ..into a first set of planes, and which includes sensing means including polarizing means for blocking entry of light in said first set of planes.

4. The apparatus of claim 2 or claim 3 which includes means for dropping said masses in a free falling stream, said stream being between on the one hand said means transmitting light and said means for detecting, and on the other hand said means responsive to light.

5. The apparatus of claim 4 in which said means for transmitting light includes also colorizing means.

6. The apparatus of claim 5 in which said colorizing means is a red filter.

7. The apparatus of claim 4 in which said means for detecting reflects light when a mass is in said stream, and the light thus reflected causes said means responsive to light to sense transmissivity characteristics of said mass in said stream.

8. The apparatus of claim 7 in which said means responsive to light transmitted through said masses to remove predetermined ones thereof selectively actuates pneumatic means.

9. The apparatus of claim 8 in which said pneumatic means are actuated to remove masses of transmissive characteristics of a smaller fraction of the stream.

10. The apparatus of claim 8 in which said means responsive to light is a TV line camera.

11. The apparatus of claim 10 in which said camera includes over a lens thereof a green filter.

12. The apparatus of claim 4 in which said stream is fed by a vibrating conveyor, said conveyor being divided into a multiplicity of channels.

13. The apparatus of claim 12 in which said conveyor is divided by dividers, said dividers being triangular in transverse cross-section, each of said dividers having a base coincident with one side of a triangle and an upper vertex opposite said base, and each of said dividers being oriented so that said base is in contact with said conveyor and said upper vertex points generally upwardly.

14. The apparatus of claim 13 in which said dividers are of diminishing height in each transverse direction from the longitudinal center of said conveyor.

15. The apparatus of claim 12 in which said conveyor is fed by a divider with a multiplicity of divider walls.

16. The apparatus of claim 15 in which said masses are fed by a doffer to said divider.

17. The apparatus of claim 16 in which said doffer includes a plurality of blades mounted for rotation to engage a predetermined fraction of said masses.

18. The apparatus of claim 12 in which said conveyor is divided by dividers, said dividers extending beyond the conveying surface of said vibrating conveyor.

19. The apparatus of claim 12 which includes beneath the downstream end of the conveying surface of said vibrating conveyor a belt conveyor mounted to deliver said stream.

20. The method of separating masses of different optical transmissivities comprising:

forming a mixture of said masses into a continuously moving stream;.

passing light through said moving masses of said stream;

sensing said light transmitted through said moving masses with a line scan camera; and selectively removing from said stream responsive to the transmission sensed a predetermined portion of said moving masses.

21. The method of claim 20 in which said masses are crushed plastic bottles.

22. The method of claim 21 in which said stream is a falling stream.

23. The method of claim 22 in which said removing is by pneumatic means.

24. The method of claim 23 which includes the steps of debaling a bale of said bottles, and removing undesired non-bottle contents of said bale, prior to said forming.

25. The method of claim 24 which includes also, after said removing of undesired non-bottle contents, the step of decapping.

26. The method of claim 21 in which said stream comprises HDPE and PET bottles, and said selective removing is of one thereof but not the other thereof.

27. The method of claim 26 in which thereafter second and third streams are formed, the second stream comprising clear HDPE bottles and colored HDPE bottles and the third stream comprising clear PET bottles and green PET bottles, and optical transmissivity means cooperating with said second stream and said third stream respectively separates said clear and colored HDPE bottles and said clear and green PET bottles.

28. The method of claim 21 in which said stream comprises clear HDPE bottles and colored HDPE bottles, and said selective removing is of one thereof but not the other thereof.

29. The method of claim 21 in which said stream comprises clear PET bottles and green PET bottles, and said selective removing is of one thereof but not the other thereof.

30. An apparatus for separating plastic masses with differing optical transmissive properties comprising:

conveyor means for presenting continuously moving masses;

means for transmitting light through said moving masses;

a line scan camera responsive to said light transmitting means for detecting the quantity of light transmitted through said moving masses; and ejector means operably coupled with said line scan camera for removing predetermined ones of said moving masses.

31. The method of separating masses of different optical transmissivities comprising:

forming a mixture of said masses into a plurality of continuously moving streams;

passing light through said moving masses of said plurality of streams;

sensing said light transmitted through said moving masses of said plurality of streams with a line scan camera; and selectively removing from said plurality of streams responsive to the transmission sensed a predetermined portion of said moving masses.

32. An apparatus for separating plastic masses with differing optical transmissive properties comprising:

conveyor means for presenting a plurality of streams of continuously moving masses;

means for transmitting light through each of said plurality of streams of moving masses;

a line scan camera responsive to said light transmitting means for detecting the quantity of light transmitted through said moving masses of said plurality of streams; and ejector means operably coupled with said line scan camera for removing predetermined ones of said moving masses from said plurality of streams.

* * * * *

UNITED STATES PATENT AND TRADEMARK OFFICE
CERTIFICATE OF CORRECTION

PATENT NO.   :   5,469,973
DATED        :   November 28, 1995
INVENTOR(S)  :   Booth et al.

It is certified that error appears in the above-identified patent and that said Letters Patent is hereby corrected as shown below:

Column 5 line 33, "byhand" should be --by hand--.

Signed and Sealed this

Twenty-sixth Day of March, 1996

Attest:

BRUCE LEHMAN

*Attesting Officer*    *Commissioner of Patents and Trademarks*